United States Patent [19]

Squibb

[11] Patent Number: 5,479,654
[45] Date of Patent: Dec. 26, 1995

[54] APPARATUS AND METHOD FOR RECONSTRUCTING A FILE FROM A DIFFERENCE SIGNATURE AND AN ORIGINAL FILE

[75] Inventor: Mark Squibb, Kingston, N.Y.

[73] Assignee: Squibb Data Systems, Inc., Kingston, N.Y.

[21] Appl. No.: 39,702

[22] Filed: Mar. 30, 1993

Related U.S. Application Data

[63] Continuation of Ser. No. 515,164, Apr. 26, 1990, abandoned.

[51] Int. Cl.$^6$ ............................................. G06F 15/401
[52] U.S. Cl. ........................... 395/600; 364/DIG. 2; 364/962.1; 364/962.2; 364/963.3; 364/419.19; 362/282.1; 395/161
[58] Field of Search ........................... 395/600, 144; 341/51; 364/955.3, 955.5, 956.1, 962.1, 966, 265.2, 260.81, 260.7

[56] References Cited

U.S. PATENT DOCUMENTS

| | | | |
|---|---|---|---|
| 3,711,863 | 1/1973 | Bloom | 444/1 |
| 3,715,734 | 2/1973 | Fajans | 365/127 |
| 4,491,934 | 1/1985 | Heinz | 364/900 |
| 4,558,302 | 12/1985 | Welch | 340/347 DD |
| 4,641,274 | 2/1987 | Swank | 364/900 |
| 4,807,182 | 2/1989 | Queen | 364/900 |
| 4,881,075 | 11/1989 | Weng | 341/87 |
| 5,051,947 | 9/1991 | Messenger et al. | 364/900 |

OTHER PUBLICATIONS

Sarwate, Computation of Cyclic Redundancy Checks Via Table Look–Up, Communications of the ACM, Aug. 1988 V31 No. 8 p. 1008(6).

Ramabadran et al., A Tutorial On CRC Computations, IEEE Micro, Aug. 1988, V8 Issue 4.

2 information sheets on diff(C) function in Unix.

*Primary Examiner*—Kevin A. Kriess
*Assistant Examiner*—Lucien U. Toplu
*Attorney, Agent, or Firm*—Rosen, Dainow & Jacobs

[57] ABSTRACT

Invention maintains duplicate files in safe places. A SCAN computer program creates a TOKEN Table of an earlier file. The TOKEN Table reflects the indices of successive segments of the file and the exclusive-or (XR) and Cyclic redundancy check (CRC) products of the characters in each segment. An updated file is compared to the earlier file by comparing the XR and CRC products of segments in the updated file to the XR and CRC products in the TOKEN Table. On detecting matching products for identical segments, the next segments are compared. On mismatch, the segment (window) for the updated file is bumped one character and new XR and CRC products generated and compared. The indices of the TOKEN Table and the offsets from the start of the file of the first characters of the updated file matching segments are set forth in a Match Table. Next the updated file is scrolled through for the non-matching information determined by acting on the indices and offsets of the Match Table to form the TRANSITION Table which is the Match Table and the updated file non-matching information. The TRANSITION Table contains the delta information which may be sent to another location having a copy of the earlier file thereat: the whole updated file need not be sent there. A reconstruction program at the location looks at the TRANSITION Table to determine where to get the characters for the copy of the updated file it is creating.

28 Claims, 11 Drawing Sheets

FIG. 2

```
0     1    2    3
1     1    1    1      1
THIS  IS   A TEST FILE.
```

FIG. 3

```
1     1    1          1     1         1
THIS  IS   A RADICAL  TEST  FILE.
```

FIG. 4
TOKEN TABLE

| INDEX | XR PROD | CRC 16-BIT PROD | CRC 32-BIT PROD |
|-------|---------|-----------------|-----------------|
| 0     | XR0     | CRC0            | CRC0            |
| 1     | XR1     | CRC1            | CRC1            |
| 2     | XR2     | CRC2            | CRC2            |
| 3     | XR3     | CRC3            | CRC3            |

FIG. 5
MATCH TABLE

| E.F. INDEX | U.F. OFFSET |
|------------|-------------|
| 0          | 0           |
| 1          | 5           |
| 2          | 18          |
| 3          | 23          |

FIG. 6
TRANSITION TABLE (IB FORMAT)

| E.F. INDEX | U.F. OFFSET | ADJUSTMENT |
|---|---|---|
| 0 | 0 | |
| 1 | 5 | |
| 2 | 18 | "RADICAL" |
| 3 | 23 | |

FIG. 11
MATCH TABLE

| E.F. INDEX | U.F. OFFSET | EXTENT |
|---|---|---|
| 0 | 0 | 2 |
| 2 | 18 | 2 |

FIG. 12
TRANSITION TABLE (IBE FORMAT)

| E.F. INDEX | U.F. OFFSET | END | ADJUSTMENT |
|---|---|---|---|
| 0 | 0 | 9 | |
| 2 | 18 | 23 | "RADICAL" |

FIG. 13
TRANSITION TABLE (IBC FORMAT)

| E.F. INDEX | U.F. OFFSET | COUNT | ADJUSTMENT |
|---|---|---|---|
| 0 | 0 | 2 | |
| 3 | 18 | 2 | "RADICAL" |

APPARATUS AND METHOD FOR RECONSTRUCTING A FILE FROM A DIFFERENCE SIGNATURE AND AN ORIGINAL FILE

This application is a continuation of application No. 07/515,164, filed Apr. 26, 1990, now abandoned.

BACKGROUND OF THE INVENTION

1. Field of the Invention

This invention relates to techniques for representing file differences useful in computer file protect systems and other systems, and more particularly to file transfer techniques useful in an electronic data backup system wherein only changes in a file are periodically sent to the backup system and in other systems.

2. Discussion of Prior Information

It is well known to off-load computers at the end of a work day to secure the data file against computer failure. It is also known to transmit the file to an off-site location for additional file security.

What is now known is the generation of a set of representations of the changes in a file, and the periodic relocation of that set of representations and its use to update the previous version of the file.

SUMMARY OF THE INVENTION

Accordingly it is an object of the invention to generate a set of representations of the changes made in a computer file during a period of time.

Another object of the invention is to generate a set of representatives of the changes made in a computer file which can be used to update an earlier version of the file, or to create a previous version of an updated file.

Still another object of the invention is to generate and to use such a set of representations in a cost and time effective manner.

The objects of the invention are achieved through computer programs designed to run on a micro- and minicomputers. A first or SCAN program is designed to create a TOKEN Table (or file signature) of mathematical representations of segments of the file as it exists at the start of a period (earlier file (EF)). The TOKEN Table reflects the indices (ordinal numbers) for all of the segments in the earlier file, and the exclusive-or (XR) and cyclic redundancy check (CRC) products of the set of characters for each segment. Actually, two CRC products are generated for each segment; a sixteen bit one and a thirty-two bit one. The three products, XR and two CRC, are generated for speed in comparisons: the XR product is first compared because it is the fastest comparison; then the slower sixteen bit CRC one if necessary; and finally the still slower thirty-two bit CRC if necessary.

A second program is used at the end of the period to create a MATCH Table setting forth the location of segments in the current file that are identical to those in the earlier file. The MATCH Table lists the indices of all of the segments in the earlier file and the file offsets of the first character of the corresponding identical segment in the updated file. The second program calculates the mathematical representations of the first segment (window) in the updated, revised or current file, first calculating only the XR product and comparing it to the XR product for the first earlier-file segment in the TOKEN Table and noting whether a match exists. If so, it then calculates the sixteen bit CRC product and compares it to the sixteen bit early file CRC product and notes whether a match exists; if so, it finally calculates the more time consuming but more reliable thirty-two bit CRC product and compares it to the thirty-two early file CRC product and notes whether a match exists; and if so, makes an index and offset entry in the MATCH Table for the identical segments; the offset entry being the ordinal number of the first character in the current file segment string of characters. (The earlier file segments are numbered (indexed) sequentially.). If a segment match is obtained, the second program calculates one or more mathematical representations for the next segment in the current file, and compares them to the products associated with the next index in the TOKEN Table and representing the second segment of the earlier file. However, if a mismatch obtained, the window (which retains segment size) is bumped along one character, new product(s) calculated for the window characters and comparison(s) again made with the same representations of the earlier file segments in the TOKEN Table. This continues until a match obtains at which time the index for the earlier file segment and the offset of the first character in the matching current file window (segment) are recorded in the MATCH Table. The process then continues as above to the end of the current file. Only the XR product is calculated in the event of an XR product mismatch; the sixteen bit and the thirty-two bit CRC products being generated respectively only in the event of earlier matches of the XR and sixteen bit CRC products.

A third program creates a TRANSITION Table that reflects what's in the current file that's not in the earlier table, and where. It scrolls through the list of indices and offsets in the MATCH Table, to see if each offset number differs from the previous one by the segment size. When such an offset differs from the previous one by more than the segment size, it adds the segment size to the first offset to determine the file ordial number of the first character in the nonmatching information, subtracts one from the second offset to determine the last character, goes to the current file and lifts therefrom that set of characters beginning with that ordinal number and stopping with the character preceding the extra-spaced offset, and adds them to the MATCH Table to create with the index a TRANSITION Table.

Thus creation of the Transition Table involves assuring that every character in current file is accounted for in the TRANSITION Table. The MATCH Table provides all of the information necessary for this accounting. Each entry in the beginning column represents a match in the early file of segment characters to the current file characters at location beginning. The matching segment in the early file is located at that offset, which is equal to the index times the segment size in early file.

Essentially the same process is followed for a deletion. The second program, if no match obtained for an earlier file segment by the end of the updated file (or over a predetermined number of segments as conditioned by the character of the file), would have proceeded to endeavor to match the next index mathematical representations in the TOKEN Table with a current file segment, with no offset entry having been made in the MATCH Table for the index of the segment that was unmatched. On proceeding with the index and representations of the next earlier-file segment, the window of the current file would be bumped along, and the index and offset number entered in the MATCH Table when the match of the mathematical representations occurred. The third program on scrolling through the MATCH Table offsets, notes the missing offset, notes the preceding offset, adds the segment size to the previous offset and copies from that number forward the reduced characters if any in the current file before the next offset, into the TRANSITION Table and in association with the index number of the unmatched segment.

The TRANSITION Table is used to update a copy of the earlier file. Typically, a fourth program and the earlier version of the file are on an off-site location and the TRANSITION Table representations are electronically transmitted thereto. The fourth program will examine the indexes and offsets of the TRANSITION Table, copying segments from the earlier file where the succeeding offset just differs by the segment size, into what is to be a duplicate version of the updated file, making additions where the offset numbers differ from the preceding ones by more than the segment size with the information provided in the TRANSITION Table, and substitutions from the TRANSITION Table where the offset numbers are missing.

As observed earlier, the TOKEN_Table mathematical representations of file segments may be the products of exclusive-oring of the characters in successive earlier file segments and of generating two cyclic redundancy check (CRC) products for each earlier file segment. Corresponding XR products are most quickly generated, but do not detect character order differentiating; a sixteen bit CRC will catch most of these transpositions; a relatively slowly generated thirty-two bit CRC product will detect essentially all of them.

As observed earlier the MATCH Table is generated by the second program generating mathematical representations of the segment sized windows of the current file, and comparing the representations of a window with an index's associated mathematical representations in the TOKEN Table. As long as matches obtain, successive window sized segments of the current file are addressed and a MATCH Table listing reflecting the early file segment index and the current segment first character offset is generated. Normally three mathematical representations of each segment obtain—an exclusive-or (XR) one and sixteen bit and thirty-two bit cyclic redundancy check (CRC) ones. In the interests of speed, the XR products are compared first, and if a mismatch occurs in them, it is clear that the segments are unmatched. However, even if the XR products match, the segments may not match because the XR operation is not sensitive to the transposition of characters. Accordingly, it is also necessary on XR match, to compare the sixteen bit CRC product. On sixteen bit CRC match, it is desirable to do a thirty-two bit CRC match for most applications to achieve practically one hundred percent certainty. The generation of the CRC product is a relatively slow process and is avoided where possible as on XR mismatch. However, the great benefit of avoiding CRC calculations occurs in operations subsequent to segment mismatch.

As observed earlier, upon detection of a mismatch, a segment sized window representing only a one character displacement of the window in the current file is operated upon to determine its mathematical representations and compare them with the representations of the just compared TOKEN Table representations, then on mismatch upon successor windows until a match obtains or the end of file is reached. By generating first the quickly generated exclusive-or (XR) products, and only on match generating the more slowly generated CRC products, a significant amount of time can be saved.

Applicant has further discovered that even the exclusive-oring process can be expedited on a one-character shift of the window under consideration. Thus the next XR product need not involve the exclusive-oring of each of the characters of the new window: rather only the exiting character and the entering character need be exclusive-ored with the existing XR product of the just tested segment. The second exclusive-oring of the exiting character amounts to a subtraction of it from the segment product.

Another feature of the invention is that the amount of updating material that must be transmitted to the off-site is minimal; normally being less than five percent (5%) of the current file.

An advantage of the invention is that it provides an easy way to secure a user's data from fire, theft and tampering.

Another advantage is that is provides an inexpensive disaster recovery insurance.

A further advantage is that it eliminates the tedious chore of computer backup, and allows the user's office time to be dedicated more fully to the productivity and profitability of his or her business.

Yet another advantage of the invention is that programs embodying the invention can be incorporated in larger programs for handling large model files which are immune to character insertions and deletions and grow in size to accommodate new records. Thus under certain circumstances, it is possible to skip creation of MATCH and TRANSITION Tables by windowing techniques.

BRIEF DESCRIPTION OF THE DRAWINGS

These and other objects, features, and advantages of the invention will become apparent from a reading of the following specification when considered with the appended drawings wherein:

FIG. 2 is a representation of the contents of a user's earlier file;

FIG. 3 is a representation of the contents of the user's updated file;

FIG. 4 sets forth a TOKEN Table which consists of the indices and the exclusive-or (XR) and cyclic redundancy check (CRC) products of successive segments of the earlier program;

FIG. 5 sets forth a MATCH Table reflecting a comparison of the TOKEN Table contents with the identical segments of the current program;

FIG. 6 sets forth a TRANSITION Table reflecting the differences in the two files of FIGS. 2 and 3;

FIG. 11 sets forth a MATCH Table having an alternate format to that of FIG. 5;

FIG. 12 sets forth a TRANSITION Table having an alternate (IBE) format; and

FIG. 13 sets forth a TRANSITION Table having another (IBC) format.

DETAILED DESCRIPTION OF EMBODIMENT

Figure 1:
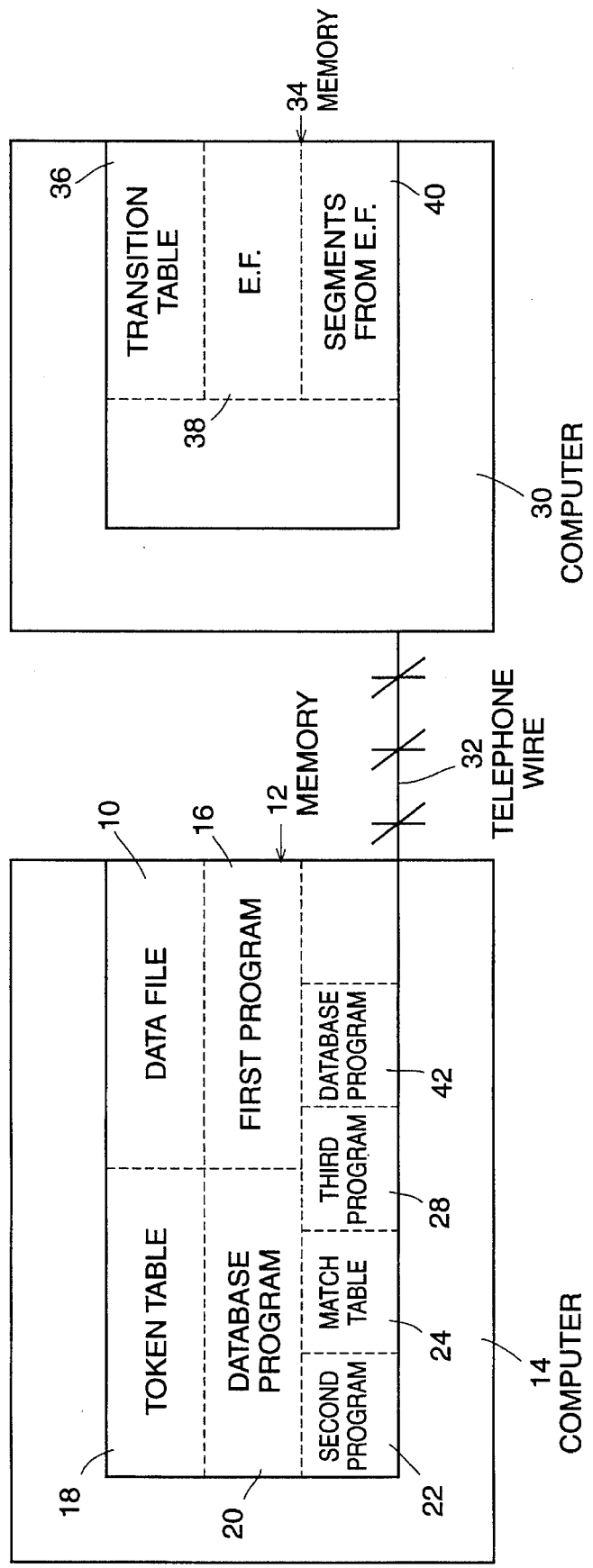
FIG. 1 is a diagram of a system according to the invention.

The system concept of the invention is shown in FIG. 1. A user maintaining a data file 10 (FIGS. 1 and 2) such as "This is a test file." in a memory generally indicated by the number 12 of a computer 14, would at the start of the workday, activate a first program 16 (FIG. 7) also in the computer memory to partition the earlier file into five characters segments, generate XR and CRC products for each segment, and list each segment by its index (ordinal number) and its products in a TOKEN Table 18 (FIG. 1 and 4) in the memory 12 and that he might care to store for the workday on a disk drive (not shown) to maximize available memory space. During the day, the user would update, as by inserting the word "radical", the file 10 so that it reads "This is a radical test file." (FIG. 3), using a conventional data base program 20 also in the memory. At the end of the workday, the user would activate a second program 22 (FIG. 8), then located in the memory 12, to create in the memory 12 a MATCH Table 24 (FIGS. 1 and 5) consisting of indices from the TOKEN Table and the offsets of the first characters of segments (windows) of the updated file that result from the matching of the exclusive-or (XR) and cyclic redundancy check (CRC) products of updated file segments with the products associated with the indices.

The third program 28 in the memory 12 (FIG. 9) works in conjunction with the MATCH Table or "difference signature", to develop the TRANSITION Table which succinctly defines what is or is not in the current file that was not or was in the earlier file. It does this by scrolling through the offsets in the MATCH Table. It looks at the offsets for successive indices, checking to see if it differs from the previous offset by the segment size. When it doesn't, it copies the current file material between the end of the last segment and the start of the segment with the greater than segment size offset, into the TRANSITION Table, there to be associated with the index of the greater than segment size offset.

It results that the TRANSITION Table reflects the changes obtaining in the current program over the earlier file.

The TRANSITION Table is then electronically sent, using conventional modems and communication programs, to the off-site computer 30 over telephone wire 32. Computer 30 has a memory generally indicated by the number 34 which receives the TRANSITION Table in section 36. The earlier file would normally already be resident in section 38 of the memory 34, representing the file as it was updated at the end of the previous day. The fourth program (FIG. 10) creates a duplicate of the current file by inserting or deleting information according to the dictates of the TRANSITION Table in memory section 36 and the contents of the earlier file in memory section 38. As long as the offsets for successive indices differ by the segment size, the program copies the segments for the indices from the earlier file into the memory section 40. When an addition is indicated as at index 2 because the offset FIG. (18) is larger than the normal segment size (5) over the previous offset FIG. (5), the fourth program looks for the additional information (here "radical") in the related area of the TRANSITION Table and inserts it in the duplicate file, after the tenth character (number 9). The fourth program then continues reviewing the TRANSITION Table and copying from the earlier file until another non-segment-size-distant offset (here none) is detected.

The TOKEN Table 18 (FIGS. 1 and 4) is created by the first program 16 (FIG. 7) first partitioning the earlier file into fixed sized segments (here five characters) and then generating a mathematical representation for each segment by first creating an exclusive-or (XR) hash product of the characters of each earlier file segment, and then creating a cyclic redundancy check (CRC) product of the characters of each of the segments. Characters of a segment are normally represented by bytes of eight binary bits each, which bytes are exclusive-ored in turn, the first two being exclusive-ored and then that product with the byte of the next character, and so on until the last character (here the fifth) has been exclusive-ored, and the product (exclusive-or hash) stored in the TOKEN Table 18 with the associated index.

Mathematical operations other than exclusive-oring, such as checksum may be employed, but exclusive-oring is the fastest.

Since the exclusive-oring operation is not character order definitive, a second mathematical operation (here cyclic redundancy check(CRC)) is performed by the first program on each segment and recorded in the TOKEN Table with the associated index. There are many polynomials for generating CRCs: applicant incorporates in the first program the thirty-two bit ANSI X. 3.66 CRC Checksum files that appear in FIPS PUB 71 and in FED-STD-1003, to generate the CRC entry for each index in the TOKEN Table (FIG. 4).

As CRC calculations for CRC products are very slow compared to those for XR products, it may be desirable to increase the reliability of the XR product(s). Reliability may be increased by generating intermediate XR products, such as the XR product of half of the characters in a segment. Thus given a series of arbitrarily assigned binary terms for the various characters as indicated below, with segment size equal eight, quarter and half products may be generated respectively and are shown in the right hand columns, the underlining in the more leftward columns indicating where the products are taken:

| character | binary | XR (Quarters) | | XR half | |
|---|---|---|---|---|---|
| T | 01100110 (C0) | | (Q0) | | |
| H | 00101001(C1) | 01010000 | | | |
| I | 01010101 (C2) | | (Q1) | | (H0) |
| S | 10110111(C3) | 11100010 | | 10110010 | |
| — | 00010000 (C4) | | (Q2) | | |
| i | 01010101(C5) | 01000101 | | | |
| s | 10110111 (C6) | | (Q3) | | (H1) |
| — | 00010000(C7) | 01010111 | | 11100010 | |
| XR (seg.) | 01010000 | 01010000 | | 01010000 | |

The segment "This_is_" may be divided into one or more equal sized parts (excepting perhaps the last to accommodate an odd segment size). In this example four separate terms are used. (Each subterm, during nonmatching window operations, may be adjusted by x-oring out the exiting character and x-oring in the incoming character.)

The quarter terms may be combined in any order or fashion. The following expressions are equivalent:

$$XR\ (segment) = C0\ C1\ C2\ C3\ C4\ C5\ C6\ C7$$
$$= Q0\ Q1\ Q2\ Q3$$
$$= H0\ H1,\ \text{where "\ \ "} = XR\ \text{operation}$$

Therefore the XR product Term may be expanded to include more information than the XR segment carries without sacrificing the runtime speed advantage of the XR window technique.

The following expressions represent combinational variations of the above rules which, in the context of this invention may be used to provide additional effeciency benefits:

Whereas the Regular XR (segment) product term is the XR sum of C[0–7]=Q[0–3]=H[0–1], subterms__(Q and H . . . ) may be introduced to add precision (quality) to the XR test.

The quality of the XR test is important. The runtime efficiency of the engine depends upon 1) the quality of the XR test; a more precise XR test solution will cause less frequent fallback to the more expensive CRC tests; and 2) the efficiency with which the XR tests can be implemented as related to standard processor architecture.

Currently supported processor environments favor a two term XR test:

$$\text{Specifically: XR (segment) \& H (0)} \xrightarrow{\text{(8 bit)\ \ (8 bit)}} 16\ \text{bits.}$$

Using just a standard XR test (8 bits), a false compare with random data permits a CRC hit (1:[2 to 8th=256]) times. By including a single subterm (H0) this ratio is increased to (1:[65636= 2 to 16th]), thereby saving considerable CPU resources. Given more robust computer processing units, more subterms may be included to further enhance performance and reliability.

If sufficient terms are included, the reliability of the XR product or test may be enhanced sufficiently such that the stringent requirements for the CRC tests may be relaxed and the minimum reliability requirements achieved in a more time effective manner.

Figure 7:
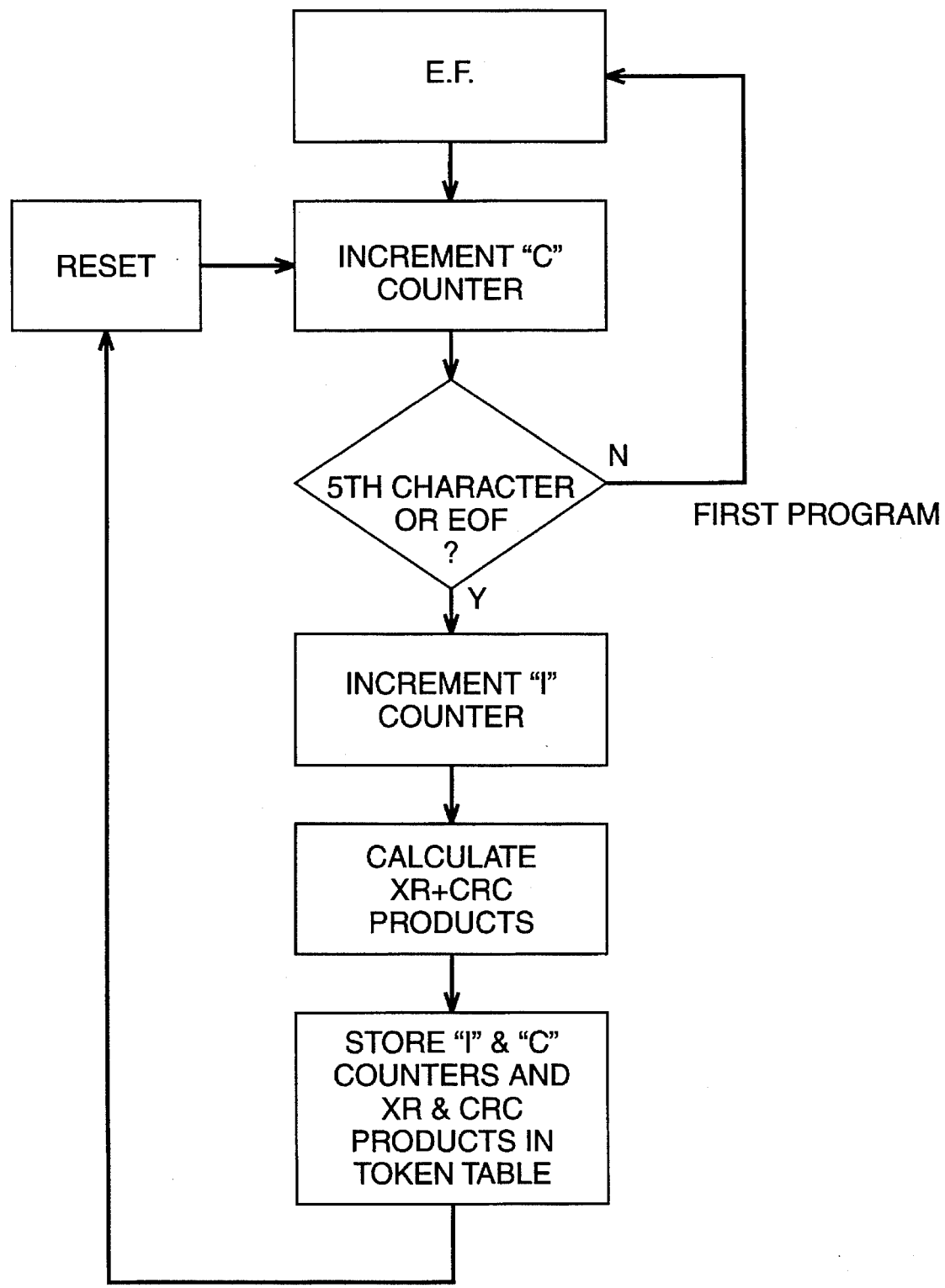
FIG. 7 is a flow chart setting forth the method of the first or TOKEN Table generating program.

The flow chart of FIG. 7 details the operation of the first program. Characters are read from the earlier file EF and when the fifth character is encountered, an index counter is incremented, the XR and CRC products calculated, the index counter contents and products stored in the TOKEN Table, and the character counter reset.

Once the TOKEN Table has been created, the file 10 is opened for updating. In the example of this application, the earlier file "This is a test file" (FIG. 2) is updated, using conventional data base program in memory section 42, with the word "radical" followed by a spare to read "This is a radical test file." (FIG. 3), and this is assumed to be its status at the end of the workday.

The second program 22 (FIG. 2) is actuated to begin the creation of the MATCH Table (FIG. 5) at day's end. It generates mathematical representations of similarly sized segments (windows) of the updated program and compares them to those of the earlier program in the TOKEN Table. Thus, the first segment of the five characters in the updated file would have its exclusive-or and CRC products compared to those in the TOKEN Table of the first segment of the earlier file, and if found equal as they should be in the examples since the identical characters and order obtain in each, the index "0" indicating the first earlier file segment and the offset "0" indicating that the first character in the identical segment in the updated file is the first character in the updated file, are recorded in the MATCH Table. In the examples, the second segments should be found equal, too, and the index "1" and offset "5" recorded. On the third segment, a mismatch of the exclusive-or, and if not, the CRC products should obtain as the segments being compared have the characters "test" and "radic", respectively. Accordingly, the second program increments as the next updated-file segment to be mathematically treated (that is, advances or bumps the updated-file window of consideration, here five characters), one character forward and here involving the updated-file characters "adica". When compared to the mathematical representations of the number 2 segment of the earlier file, a mismatch should again be detected. The program then repeats the operation on succeeding segment windows spaced one character until a match obtains, here involving the third file segment containing the characters "test". The index "2" and the offset "18" are recorded in the MATCH Table The representations of the next segments, of the updated file would match those in the TOKEN Table for the index "3" and hence the index "3" and offset "23" would be entered in the MATCH Table and a suitable end of the file signal noted to end further segment search.

Figure 8:
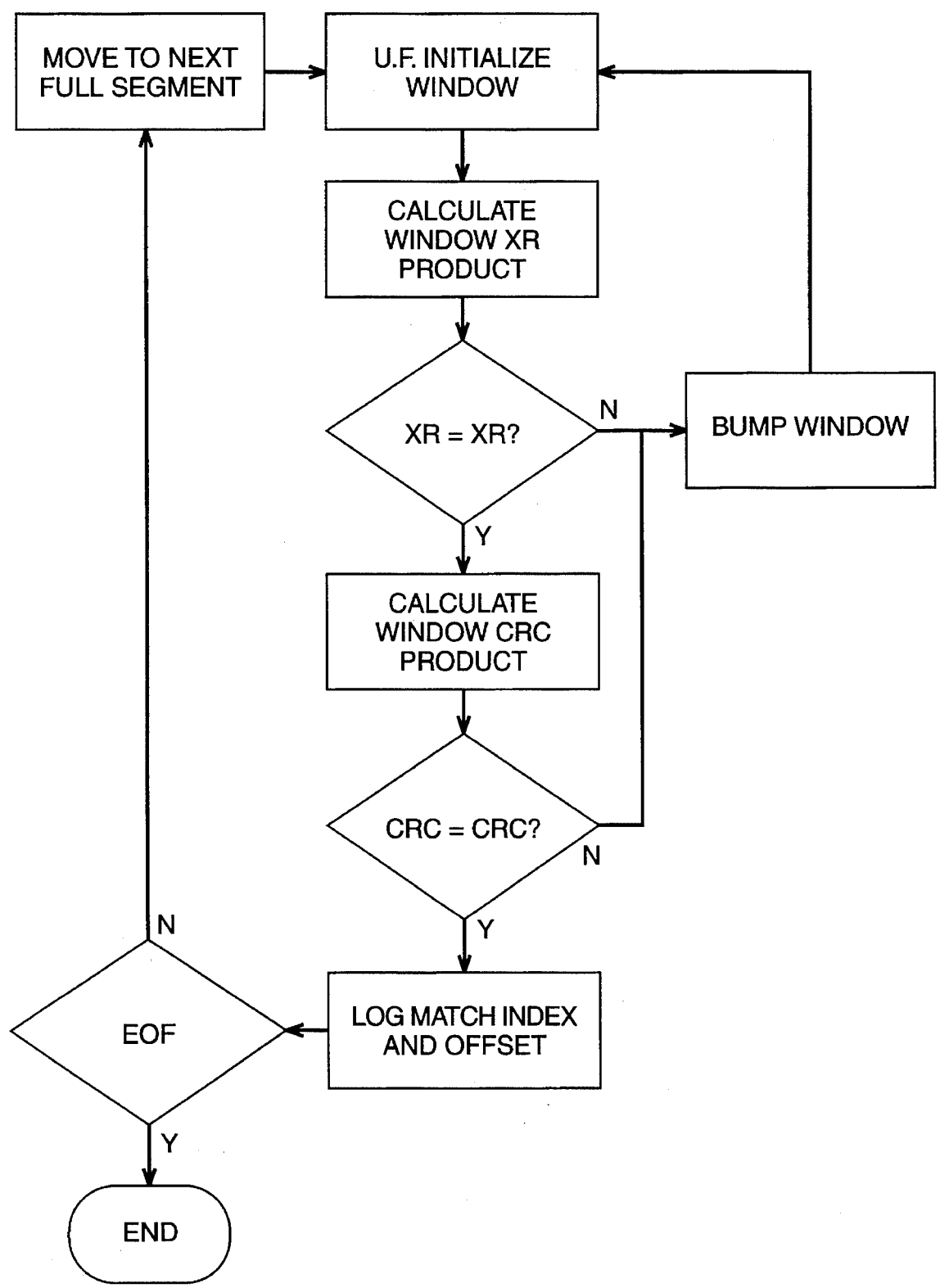
FIG. 8 is a flow chart setting forth the method of the second or MATCH Table generating program.

The flow chart of FIG. 8 details the operation of the second program. The program looks at the first segment (window) of the updated file, calculates the XR product, compares it to the XR product for the first index in the TOKEN Table, and if no match obtains, bumps the window to repeat the process. If an XR match obtains, it calculates the CRC product and compares it to the CRC product for the index in the TOKEN Table. If a match obtains, the index and the file offset of the first character in the updated file are recorded in the MATCH Table and the window of consideration for the second file shifted one full segment.

Figure 8A:
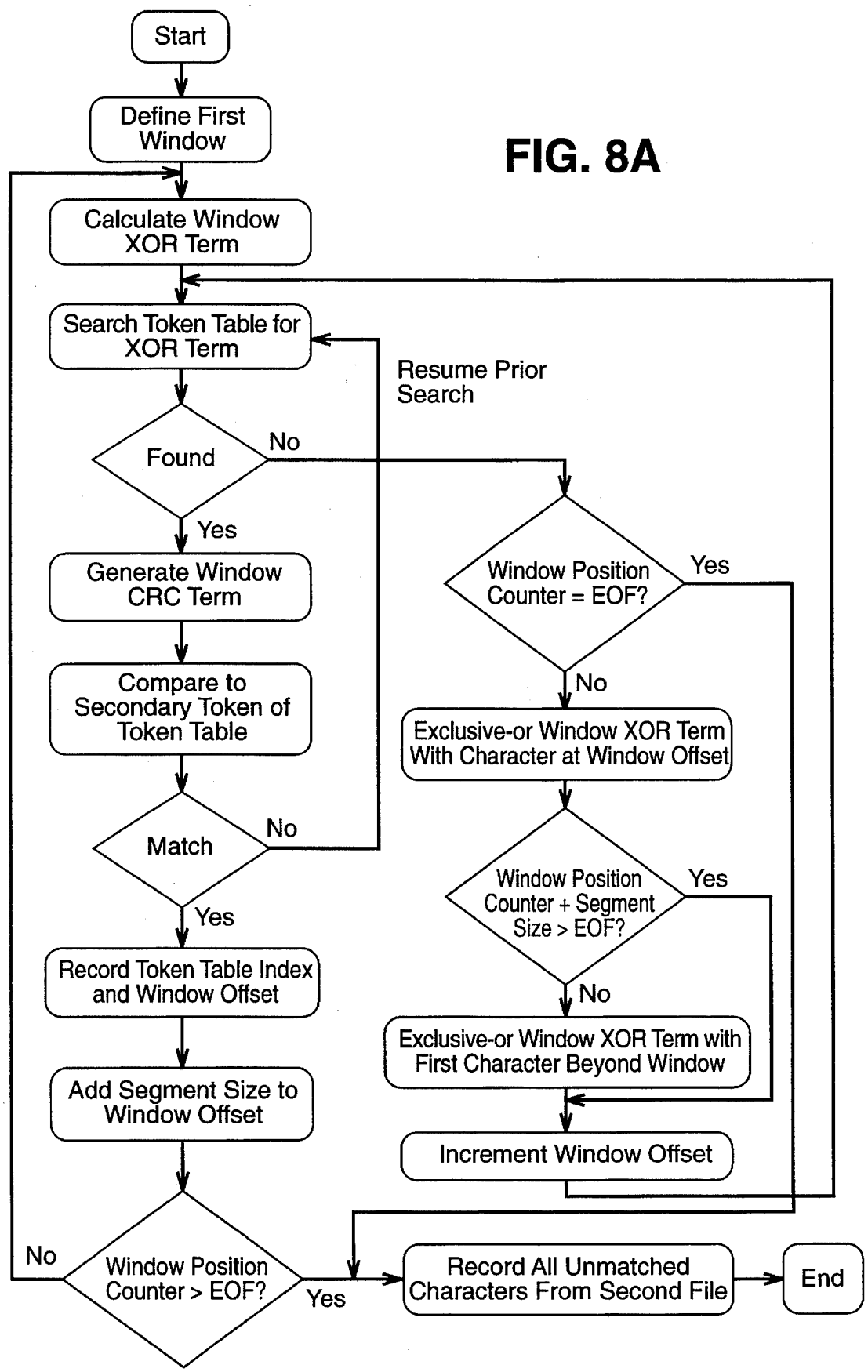
FIG. 8A is a somewhat more detailed flow chart of the method shown in FIG. 8.

FIG. 8A is a somewhat more detailed flow chart of the operation of the second program.

As an example of a file deletion, consider that the only change to the earlier file involved deletion of the word "a". The updated file would now read: "This is test file.". When the second program is actuated to generate the MATCH Table, it would find that the mathematical products for the first segments match and proceed as above. However, it would find that those of the second segments ("is a" and "is te") do not match. Nor would it find a match on bumping the segment window through the rest the updated file, thus no offset of the updated file ordinal number of the first character of an identical segment would be recorded in the MATCH Table, only the index "1" would be recorded. Then the program would return to look for matches of the third earlier file segment in the updated file. Of course here matches would obtain on the segments "test", and the index "2" and the offset "8" duly recorded in the MATCH Table. On scrolling through the MATCH Table, the third program would note that the offset "8" for the updated program segment matching the third segment in the earlier program was less than a full segment size (5) from the previous one, and thereupon copy the current-file information after the last matching segment and before the matching segment, into the TRANSITION Table. The fourth program in creating an updated version of the original program, too would notice the nearness of the offsets and use that as its clue to substitute the TRANSITION Table information for that in the earlier file segment.

Figure 9:
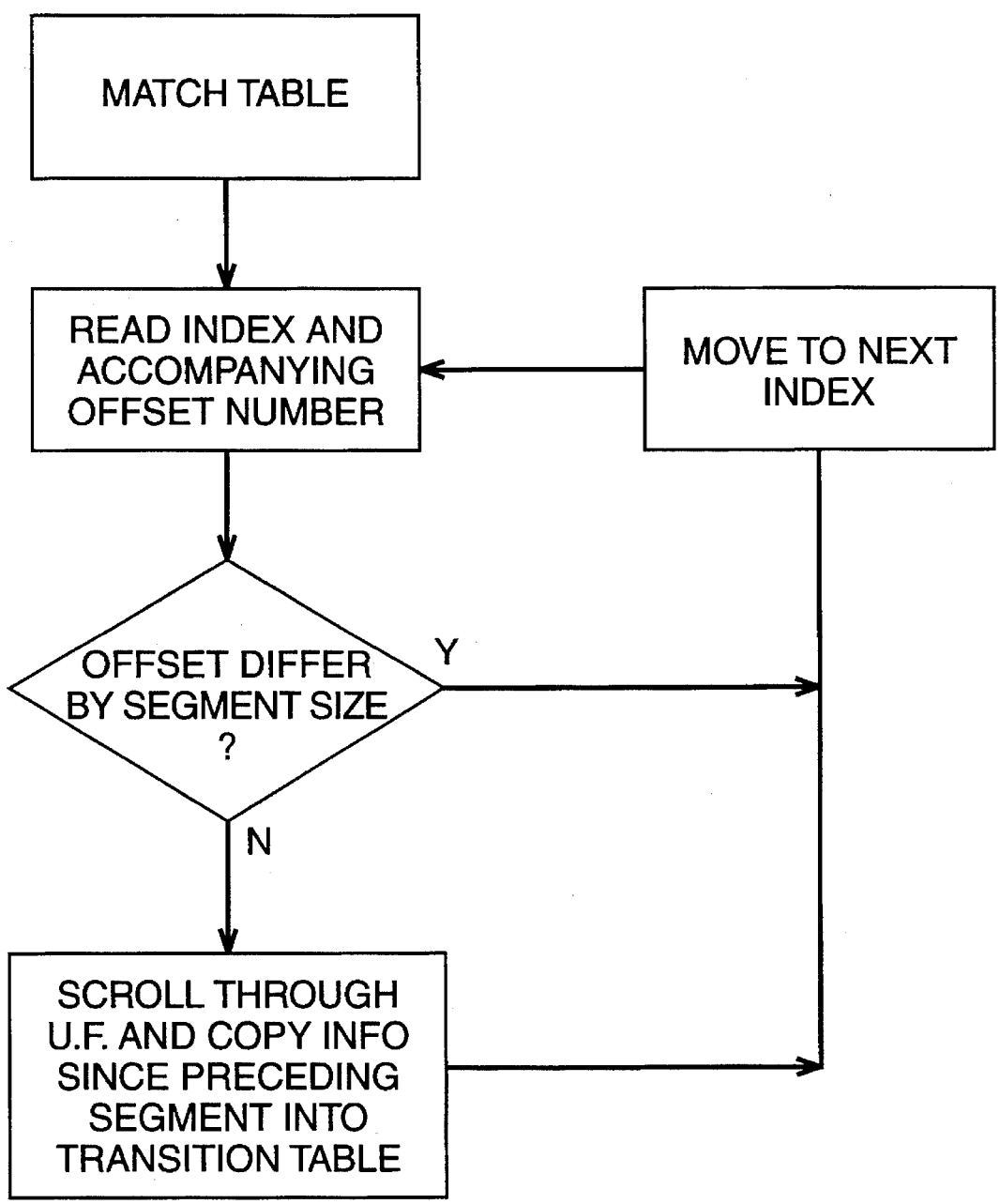
FIG. 9 is a flow chart setting forth the method of the third or TRANSITION Table generating program.

A flow chart detailing the operation of the third program is set forth in FIG. 9. The MATCH Table is read for index and offset information, the offset number compared with zero or that of the previous index, and if the difference is the segment size, advances to read the next index in the MATCH Table. If the difference was other than the segment size, it scrolls through the updated file to copy information since the preceding segment into the TRANSITION Table.

Figure 9A:
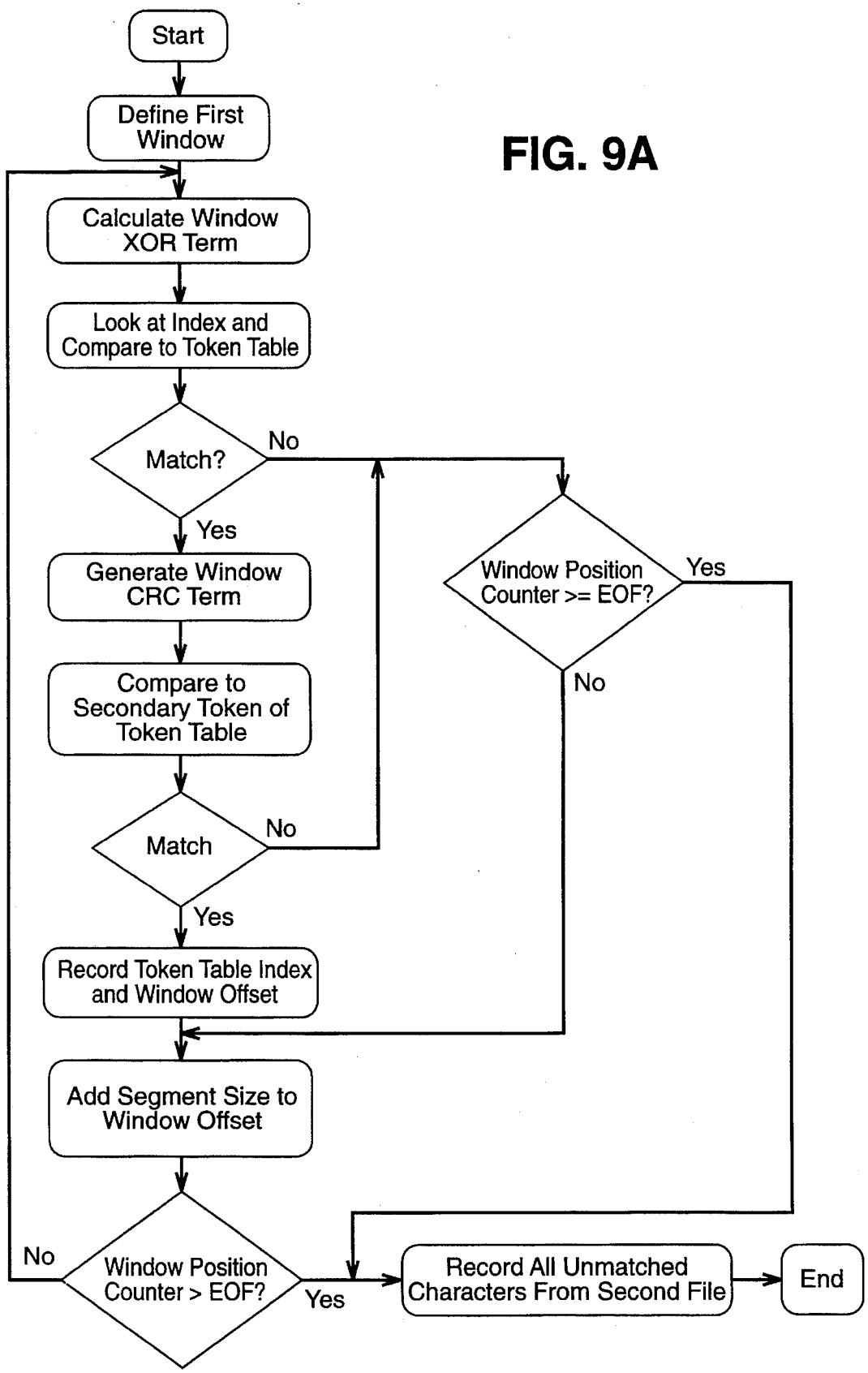
FIG. 9A shows an obvious variation of the method shown in FIG. 8A.

As an obvious variation, the second program can create the TRANSITION Table directly without the need for the third program by copying, when a mismatch between the mathematical representation for the segment in the earlier file EF and the mathematical representation for the segment window for the updated file is obtained, the character which has been bumped out of the window directly into the MATCH Table, thereby directly generating the TRANSITION Table. This is shown in the flow chart of FIG. 9A.

Figure 10:
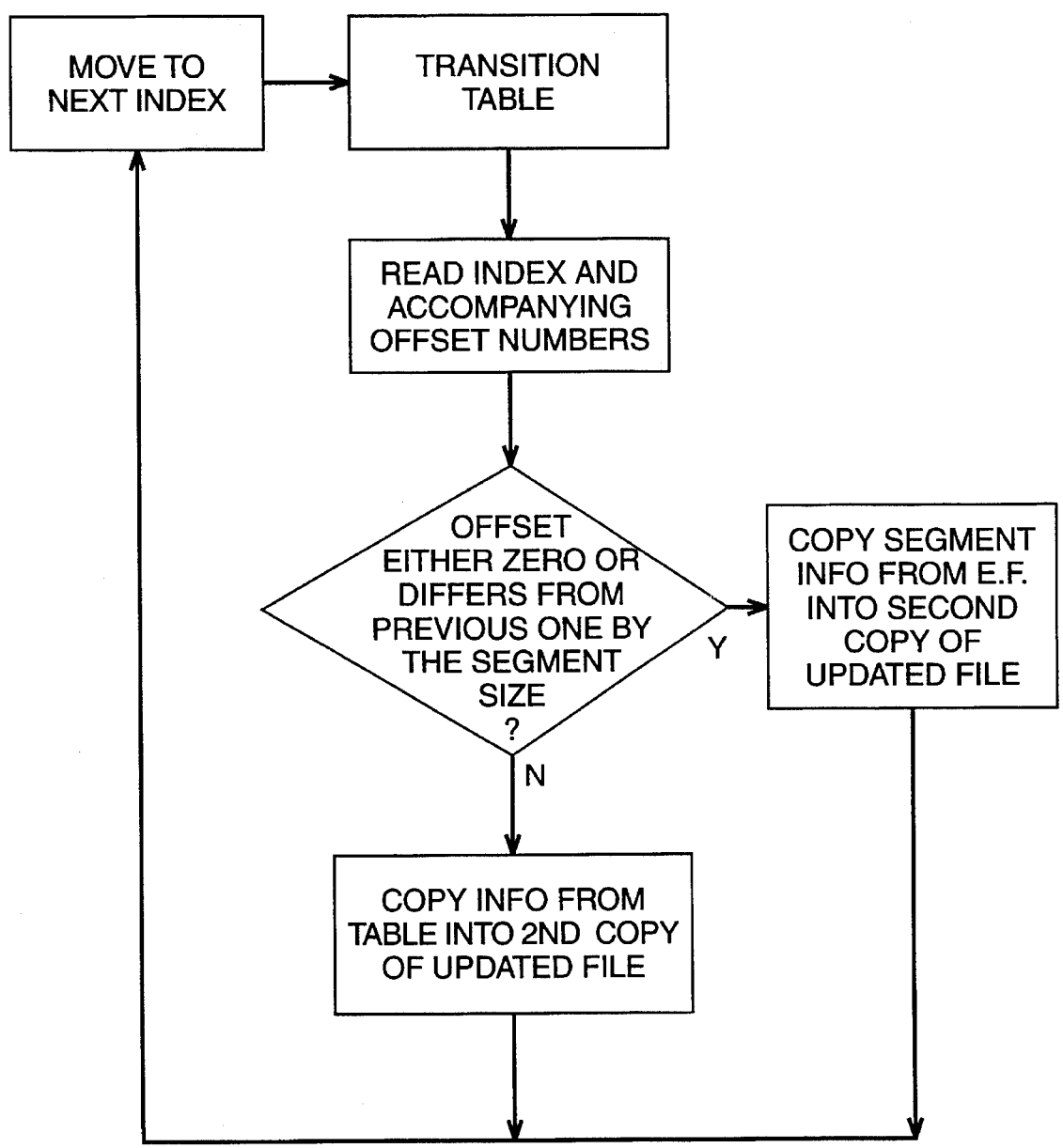
FIG. 10 is a flow chart setting forth the method of the fourth or reconstruction program.

A flow chart detailing the operation of the fourth program is set forth in FIG. 10. TRANSITION Table indices and their offset numbers are read and offset numbers checked for zero or for segment-size differences from the previous index. If it is the case, the index segment is copied from the earlier-file into what is to be the second copy of the updated file. If it is not the case, information is copied from the TRANSITION file into what is to be the second copy.

An alternate format for the MATCH Table is set forth in FIG. 11. The format visualizes not listing individually successive identical segments, but rather merely indicating their number with the index for the first of such segments. Thus, with respect to the files of FIGS. 2 and 3, the second and fourth segments of the current file would not be listed; rather the indexes for the first and third segments would have associated with them under the column "Extent" the numeral "2" to indicate that two successive segments were identical in each case. This format has the advantage of being even more concise. It in effect maintains the segment count information as the index. It is more compact for large files, where an addition may contain nine or more bytes. Hence it requires less computer memory to support it.

Alternative embodiments of the TRANSITION Table may be employed. Thus, the TRANSITION Table may include other information, such as the segment size and supervisory error detection codes, and program version information.

Thus the TRANSITION Table may be written in any one of several base formats:

| | |
|---|---|
| index beginning (offset) | IB (FIG. 6) |
| index beginning (offset) count | IBC (FIG. 13) |
| index beginning (offset) end | IBE (FIG. 12). |

The IB format sets forth the index (ordinal number) of the successive identical segments and the offsets of their beginning characters. The IBC format sets forth the index of the first offset of a set of identical segments and the number (count) of such identical segments in the set. The IBE format sets forth the end character of each set of identical segments, instead of the count. IBE format facilitates carrying end-of-file (EOF) information with it.

The IB format has been used exclusively for discussion in this document to avoid confusion.

The other formats, IBC and IBE are advantageous because they require less space than the IB format.

It will be evident that applicant has provided a method, means, and articles (signatures) for readily changing a secure file to reflect changes made in a copy of it elsewhere during an operating period such as a day. Applicant first creates a signature of the file in the TOKEN Table; the signature is the index and a mathematical representation of each of the successive equal-sized segments of the file. Then the file is updated to reflect the transaction occurring during the course of the day. At the end of the day, the mathematical representations of successive window segments of the updated file are compared with those of the earlier file in the TOKEN Table, with the window segment for the updated file being bumped one character until either a match or end of file signal is detected where upon the next earlier file segment index is compared for. A Match Table is created indicating the indexes (ordinal numbers) of the earlier file segments and the offsets (file character ordinal numbers) of the first characters of the identical updated-file segments. Next the updated file is scrolled through, and the non-matching information is copied from it, using the index numbers and offset numbers of the MATCH Table as a guide, into the TRANSITION Table. The TRANSITION Table may now be shipped to where a copy of the earlier file is, to update it according to the TRANSITION Table, by the fourth program.

As observed earlier, the programs of the invention can be incorporated in larger programs for handling large model files.

Certain files are immune to character insertions and deletions, these are large model files (LMF's). Nearly all commercial data bases create large model files. Large model files follow the following rules:

1) The file must be immune to character skewing. Data bas applications, which use records and fields obey this convention. Any change or update to a field or record will have no effect upon the location (offset) of any other record in the file.
2) If the file needs to grow in size to accomodate new records, additional records are appended to the end of the file. This format permits recycling of early file space as long as the character skewing rule is not violated.

A small model file (SMF) is any file which does not obey large model file (LMF) rules.

Thus under certain circumstances, it is possible to skip the windowing portion of this algorithm, thereby saving time and computer resources.

As a large model file example, consider an:

EF "This is a test file." _, and a

CF "This is a test file. mom"

Large model file rule 1 is met: The file modification (change i to would not cause the bytes associated with any other file character to be effected. Each matching character is at the same byte offset in early file and current file. No character skewing occurred.

Large model file rule 2 also is met: The additional information (mom) appeared at the end of the file.

For the purpose of this example, if more than 50% of a file matches under large model file rules, the small model file logic is to be omitted.

Considering further the above large model file,

| This_ | is_a_ | test_ | file. | |
|---|---|---|---|---|
| This_ | os_a_ | test_ | file. | _mom |
| match | nonmatch | match | match | nonmatch |

It can be seen that the first, third and fourth five-character segments match, and the second and fifth don't. Thus the statistics are that three segments match, therefore more than 50% current file was matched by early file.

The MATCH Table would be:

| | |
|---|---|
| 0 | 0 |
| 2 | 10 |
| 3 | 15 |

Figure 14:
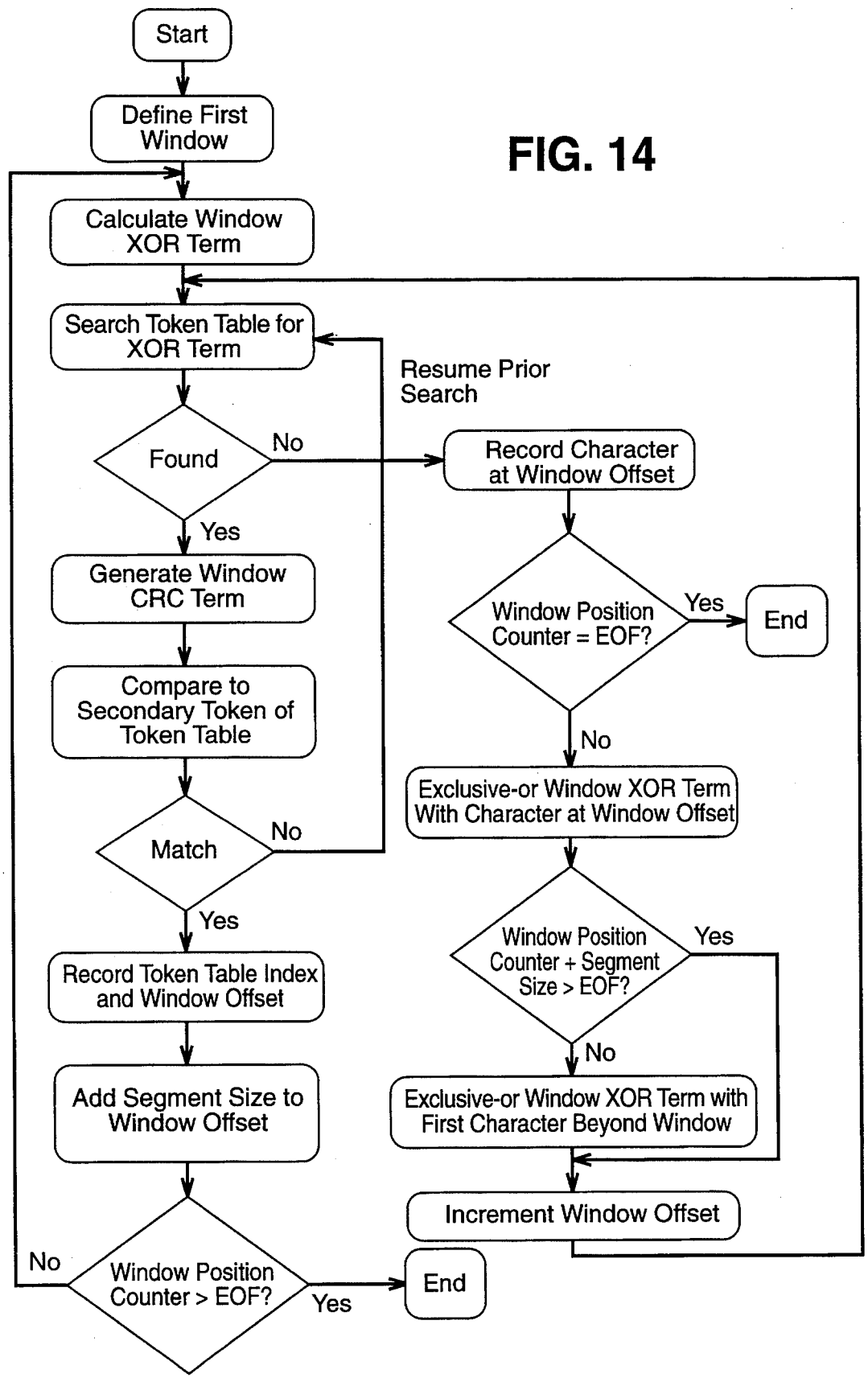
FIG. 14 is a flow chart of the program for creating the MATCH Table for large model files.

A flow chart of the program for creating the MATCH Table for large model files is provided in FIG. 14.

Therefore the TRANSITION Table should read:

| | |
|---|---|
| 0 | 0 |
| 2 | 10 |
| 3 | 15 |
| os_a___mom | |

Figure 15:
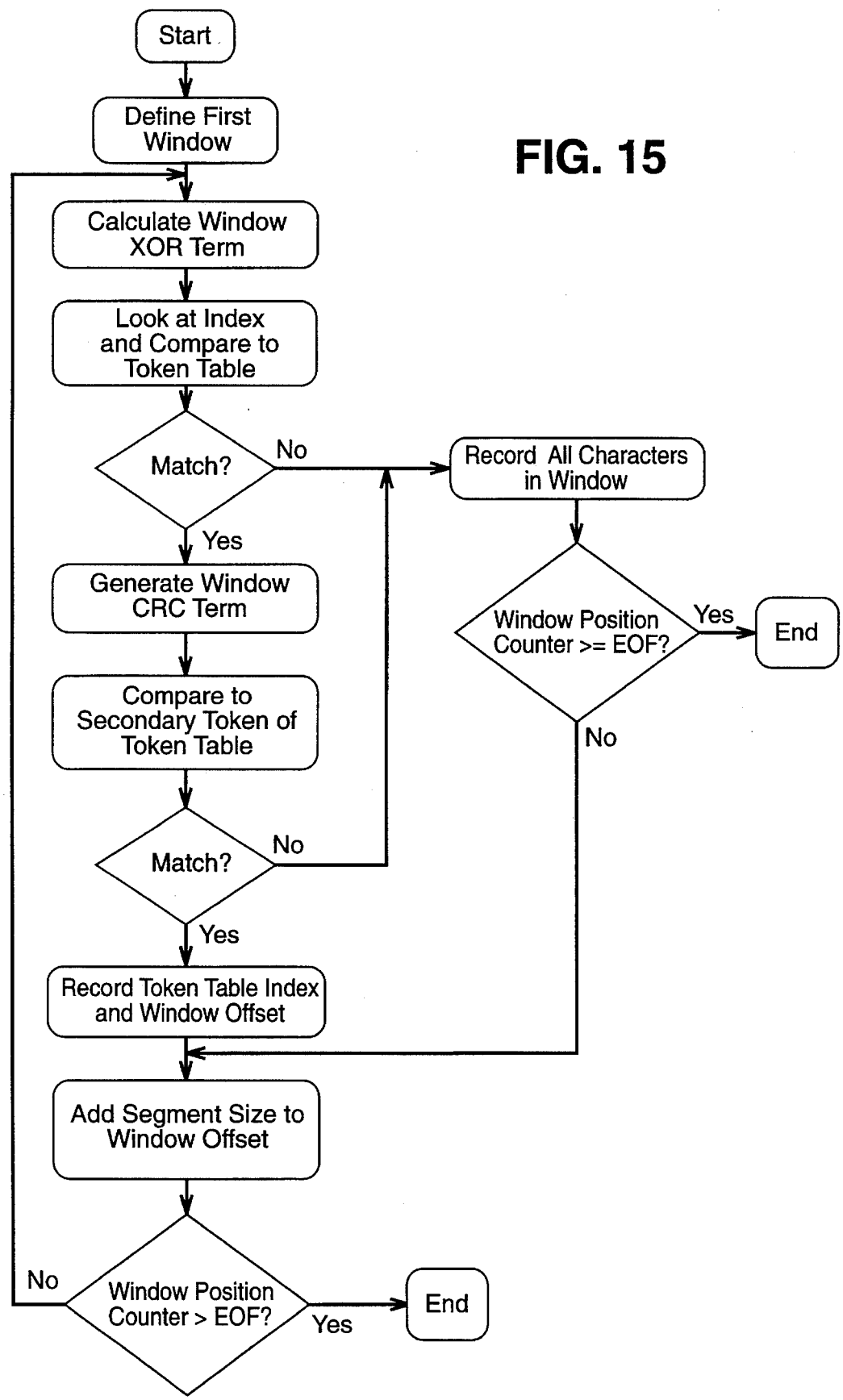
FIG. 15 is a flow chart of the steps for generating the TRANSITION Table for large model files without creating the intermediate MATCH Table.

As with small model files, the TRANSITION Table can be generated without having to generate the intermediate MATCH Table by recording segments which do not match directly into the MATCH Table. FIG. 15 is a flow chart of the steps for generating the TRANSITION Table for large model files without creating the intermediate MATCH Table.

This method of pretest, yields substantial runtime reductions on large model files. The windowing technique cannot yield superior results on files which follow large model file rules, it is therefor unnecessary to attempt to resolve such a large model file using the small model file windowing technique.

The larger program employs a two pass technique to efficiently process both large model files and small model files, it is unnecessary to employ the small model files windowing technique.

The first pass assumes that the file is a large model file. Each corresponding file segment from the TOKEN Table is compared to the corresponding current file segment. Comparison statistics are maintained. If more than a user specified percentage of the file matches using large model file rules, (or large model files rules were given at runtime) the small model file resolution logic is skipped, thereby saving considerable computer resources and time.

If the first pass comparison yields sufficiently poor results, or small model file rules were invoked at runtime, the small model file logic is invoked and the file is processed normally.

In addition to the above another computer back-up application, the invention lends itself to other applications. One such application is a media distribution application. A data vendor may maintain a large data base, say of sales tax rates for various cities and states, which is periodically updated. A mail order business may be a user of such a data base in order to charge the correct sales tax on each of its various order fulfillments. The data base maintainer would initially send the mail order business the complete data base. He would also generate a TOKEN Table of the data base as it then existed, using the first program. Upon updating his data base, he would develop a MATCH Table and a TRANSITION Table, using the second and third programs, and he would transmit the TRANSITION Table to the user. The user would update his data base, using the fourth program. The process would be repeated for subsequent updates.

In another application, the invention is used to harmonize files being independently updated at two different locations. Each location would generate a TRANSITION Table to reflect its changes, using the second and third programs, and send the Transition Table to the other location. The receiving location would then use the fourth program with the other's TRANSITION Table to update its file with the other locations changes.

In an archive maintenance application, a data base is continuously modified, say daily, and it is desired to maintain a complete daily archive. Initially, the data base as it exists at the start, would be copied onto the storage media and a TOKEN Table developed using the first program. At the end of the first day, a TRANSITION Table would be developed, using the second and third programs and copied onto the storage media having the original data base; also a new TOKEN Table would be created. At the end of the second day, a new TRANSITION Table would be developed and copied onto the storage media; also a new TOKEN Table. By continuing this daily process, a complete archive can be maintained on significantly less media than would normally be required, and the data base can be restored, using the fourth program, as it existed on any given day.

Another application involves a WORM Work File Maintenance System. (A WORM is a Write Only Read Many storage device.) Such a system may include a server having a computer and a normal read/write/erase disk drive (DASD) and a WORM, Several other computers are connected to the computer server through a high speed network. At the end of the first day, all data from the other computers is copied onto the DASD. At the end of the second day, the data on the other computers is compared to the data on the DASD to generate the TRANSITION Table which is copied on the WORM. The data from the other computers is copied onto the DASD, either directly or by updating, to replace that of the previous day. On the third day, the process of the second day is repeated, except for the new TRANSITION Table being added to the TRANSITION Table already on the WORM. The fourth and further days essentially involve repeats of the third day. The data as it existed on a given day can be reconstructed by working backwards from the current data on the DASD and the TRANSITION Tables on the WORM. Thus all history is maintained, and no additional supporting backup is required for the discrete and physically separate computers.

The invention also is useful in word processing applications. Instead of full copies of the updated versions, only TRANSITION Tables need be maintained. The initial version of a document is stored as is on a backup device. A TRANSITION Table is developed for the first updated version and stored on the backup device too. A TRANSITION Table is developed for the next updated version, reflecting the differences between it and the previous updated version, and it too is added to the back-up-device. The backup device thus holds the original version of the document and TRANSITION Tables reflecting subsequent documents in a minimum of storage space, and any version of the document can be recreated.

From a consideration of the above, it is evident that it is not a requirement of the invention that the early file be retained. This invention was adopted to facilitate the description of the invention. Kindly consider the below application which reverses the role of early file and current file, allowing the early file to be created from the current file and the TRANSITION Table.

In a word processor application, it is the intent of the user to maintain a logical path back to every revision of a work, while retaining only the current file and the TRANSITION Table.

Assume that the author is working on the fifth generation of the work and has the fourth saved locally. The author generates a TOKEN Table for 5(5.h) and compares it to 4. The TRANSITION Table created is in a "reverse" sense. Restated, the fifth generation plus the TRANSITION Table equals the fourth generation. The author can recover the fourth generation of the document by applying the T54 file to the current file (CF) to recover early file (EF). The earlier fourth 4 can now be erased.

In this example, the invention does not require the present availability of the early file.

A printout listing of the computer program embodying the invention follows. It consists of the Terac.exe modules in object code in hexadecimal representation and the Terac Supervisory lynx.ksh module in UNIX Script representation, and the caret.exe modules in object code in hexadecimal representation.

While there has been disclosed preferred embodiments of the invention, it will be appreciated that other embodiments embodying principles of the invention can be created by those skilled in the art without departing from the spirit or wording of the appended claims.

What is claimed is:

1. A method for producing a difference signature of differences between an original file and an updated version of the original file, comprising
   (1) creating a token table from an original file in a first storage device by producing a token set for each equal sized contiguous segment of said original file, each token set comprising a primary exclusive-or based token and at least one order sensitive secondary token or cyclic redundancy check product term; and
   (2) generating a difference signature, using the token table and an updated file, by:
      (a) defining a window of consideration for the updated file, said window being of a size equivalent to the segment size used to create the token set for the original file and comprising successive characters in the updated file;
      (b) calculating a primary exclusive-or based token for the window of consideration;
      (c) searching the token table for a primary token which matches the primary token for the window and advancing to step 2(g) if said matching primary token is not found in the token table;
      (d)
         (i) generating a secondary token for said window in response to finding in the token table a primary token which matches the primary token from the window and comparing the secondary token to the secondary token in the corresponding token set in the token table; and
         (ii) advancing to step 2(e) if the secondary tokens match;
      (e) logging the offset of the current window to the difference signature to correlate the relative locations of the matching segment in the original and updated files, in response to finding a match between the secondary token from the window and the corresponding secondary token from the token set;
      (f) advancing the window of consideration by the segment size to the next segment after the matched text, if there are any remaining segments in the updated file, and resuming the method at step (2b) above;
      (g) advancing the window of consideration by at least one character to create the next window, which includes the characters of the previous window and at least one character in the updated file following the previous window minus the equivalent number of characters at the beginning of the previous window, in response to a failed token search for the previous window, which occurs where either said primary token for the previous window of said updated file is not found in the token table for said original file or where at least one matching primary token is found in the token table but no matching secondary token corresponding to said at least one matching primary token is found in the token table;
      (h) generating a primary token for said next window of consideration by adjusting the primary token from the previous window and
      (j) repeating the cycle of steps (2b) through (2i) until the updated file is exhausted.

2. A method for producing a difference signature of differences between an original file and an updated version of the original file when, in updating the original file, the majority of insertions and deletions of characters in segments of the original file are known to change the offsets of only those segments where said insertions and deletions have been made but do not change the offsets of adjacent segments, comprising;
   (1) creating a token table from an original file in a first storage device by
      producing a token set for each equal sized contiguous segment of said original file, each token set comprising a primary exclusive-or based token and at least one order sensitive secondary token or cyclic redundancy check product term; and
   (2) generating a difference signature, using the token table and an updated file, by;
      (a) defining a window of consideration for the updated file, said window being of a size equivalent to the segment size used to create the token set for the original file and comprising successive characters in the updated file;
      (b) calculating a primary token for the window of consideration;
      (c) searching the token table for a primary token which matches the primary token for the window and advancing to step 2(g) if said matching primary token is not found in the token table;
      (d)
         (i) generating a secondary token for said window in response to finding in the token table a primary token which matches the primary token for the window and comparing the secondary token to the secondary token in the corresponding token set in the token table; and
         (ii) advancing to step 2(e) if the secondary tokens match;
      (e) logging the offset of the current window to the difference signature to correlate the relative locations of the matching segment in the original and updated files, in response to finding a match between the secondary token from the window and the corresponding secondary token from the token set;
      (f) advancing the window of consideration by the segment size to the next segment after the matched text, if there are any remaining segments in the updated file, and resuming the method at step (2b) above;
      (g) advancing the window of consideration by the segment size to the next segment to create the next window in response to a failed token search for the previous window, which occurs where either said primary token for the previous window of said updated file is not found in the token table for said original file or where at least one matching primary token is found in the token table but no matching secondary token corresponding to said at least one matching primary token is found in the token table; and (h) repeating the cycle of steps (2b) through (2g) until the updated file is exhausted.

3. The method of claim 1 or 2 comprising constraining the search for the primary token for the window to the token set representing a corresponding offset from the updated file in the token table.

4. The method of claim 1 or 2 comprising limiting the search for the primary token in the token table to fewer than all token sets in the token table.

5. The method of claim 4 further comprising creating lower and upper bounds of said token table and limiting the search for the primary token in the token table to token sets within said lower and upper bounds, said bounds being created by dividing the offset of a character of the window of consideration by the segment size to produce an index value equal to an index value in the token table, subtracting a first preselected value from the index value to determine the lower bound and adding a second preselected value to the index value to determine the upper bound.

6. The method of claim 1 further comprising generating the primary exclusive-or token for each said token set and for the window of consideration by dividing each segment into sets, generating an exclusive-or product of each set, and concatenating the exclusive-or products of at least one of said sets and at least another of said sets, and wherein the primary token from the previous window is adjusted in step 2(h) by dividing the primary token into components corresponding to the sets, adjusting each component by exclusive-oring those characters which are leaving the previous window or entering said next window of consideration with the corresponding components which comprise those characters and subsequently recomposing the primary token for said next window of consideration.

7. The method of claim 1 further comprising including characters from the previous window not included in the next window in the difference signature as part of a non-matching segment before generating said primary token for said next window of consideration.

8. The method of claim 1 further comprising including characters from the previous window not included in the next window in the difference signature as part of a non-matching segment after completing step 2(j) of claim 1.

9. The method of claim 2 comprising generating the primary exclusive-or token for each said token set and for the window of consideration by dividing each segment into sets, generating an exclusive-or product of each set, and concatenating the exclusive-or products of at least one of said sets and at least another of said sets.

10. The method of claim 2 further comprising causing the contents of the entire window to be included in the difference signature before advancing the window of consideration by the segment size in step 2(g).

11. The method of claim 2 further comprising causing the contents of the entire window to be included in the difference signature after completing step 2(h).

12. The method of claim 1 or 2 wherein step 2(d) further comprises (iii) searching the token table for another matching primary token if the secondary token for said window and the secondary token for the corresponding token set in the token table do not match and the end of the token table has not been reached, and advancing to step 2(g) if said another matching primary token is not found in the token table;

(iv) comparing said secondary token for said window to the secondary token in the corresponding token set in the token table in response to finding in the token table said another matching primary token which matches the primary token from said window; and (v) returning to step 2(d)(ii)

13. A method for producing a duplicate copy of an updated filed from said difference signature produced by the method of claim 1 or 2 and from either an original file or a duplicate of said original file, further comprising using the difference signature and the original file or duplicate thereof to assemble a duplicate of the updated file by:

(a) using the original file as the source for matching segments;

(b) using the difference signature as the source for non-matching segments; and (c) assembling the matching and non-matching segments.

14. The method of claim 1 or 2 wherein said original file from which said token table is created is stored in said first storage device, said second storage device has a duplicate of said original file stored in a second storage device, and said duplicate copy of said updated file is produced in said second storage device, further comprising deleting or otherwise modifying said original file in said first storage device at any time after said token table is created by step 1 of claims 1 or 2 without affecting the ability to produce said duplicate copy of said updated file in said second storage device from said duplicate of said original file and said difference signature.

15. The invention of claim 9 wherein the second set is the entire segment to which said first set belongs.

16. A method for recording differences between first and second computer data files in a memory media associated with a programmable data processor, said files having a plurality of fixed length segments, comprising the steps of:

(1) generating a token table in said memory media by
   (a) reading a fixed length segment of said data file into said memory media;
   (b) generating a primary exclusive-or term for the segment;
   (c) generating a secondary order sensitive term for the segment;
   (d) concatenating said primary exclusive-or term and said secondary order sensitive term into a token;
   (e) recording said token in said memory media; and
   (f) repeating steps (a)–(e) for each of said plurality of fixed length segments until all of said segments in said data file have been read and the token table contains one token for each segment in said data file; and (2) recording differences between the first and second computer data files, using the token table, by
   (a) defining a window of consideration for said second data file starting at the first character of said second data file, said window having the same number of characters as each of said plurality of fixed length segments of said first data file;
   (b) generating a window exclusive-or term for the window of consideration in the same manner that the primary exclusive-or term for each segment is generated;
   (c) searching the token table for a primary exclusive-or term matching the window exclusive-or term;
   (d) if a matching primary exclusive-or term is found in the token table, (i) generating a window order sensitive term for the characters in the window of consideration in the same manner that the secondary order sensitive term for each segment is generated;

(ii) comparing said window order sensitive term with the secondary order sensitive term which forms part of the token corresponding to the matching primary exclusive-or term; and (iii) when the window exclusive-or term and the order sensitive term match the primary exclusive-or term and secondary order sensitive term of a respective token in the token table, recording information identifying the respective token and recording the offset of the window of consideration and the number of characters in the window of consideration into a difference signature in said memory media, and advancing the window of consideration by the length of a segment to beyond the last character in the current window of consideration and returning to step (2b);

(e) if no match for said window exclusive-or term is found or if no match for the secondary order sensitive term for the window of consideration is found after completion of step (2d), then, (i) adjusting said window exclusive-or term to remove the exclusive-or representation of the first character of the window of consideration in said window exclusive-or term and to add the exclusive-or representation of the next character beyond the last character in the current window of consideration to the window exclusive-or term and advancing the window of consideration forward by one character; and (f) repeating steps (2c) through (2e) until the window of consideration reaches the end of the second data file.

17. A method according to claim 16 wherein said secondary order sensitive term comprises a cyclic redundancy product term.

18. The method of claim 16 further comprising, after step (2d)(iii) and before step (2e) of claim 16, when the window order sensitive term for the window of consideration does not match the corresponding secondary order sensitive term for the respective token in the token table, resuming the search of the token table at step (2c) of claim 16 until the token table is exhausted.

19. A method according to claim 16 comprising (1) generating said primary exclusive-or term by
  (a) calculating the exclusive-or product of each character in the segment;
  (b) dividing each of said plurality of fixed length segments into equal length subsets;
  (c) generating an exclusive-or product for at least one of said subsets of a respective segment; and
  (d) including the exclusive-or product for at least one of said subsets in said token for said respective segment by concatenating the exclusive-or product for at least one of said subsets with the primary exclusive-or term to form said primary exclusive-or term;

(2) generating said window exclusive-or term by
  (a) dividing the window into subwindows; and
  (b) generating an exclusive-or product for at least one of said subwindows of a respective window; and including the exclusive-or product for at least one of said subwindows in the window exclusive-or term by concatenating the exclusive-or product for at least one of said subwindows with the window exclusive-or term to form a concatenated window exclusive-or term; and (3) said step of adjusting said window exclusive-or term comprises exclusive-oring both the first character of the window of consideration and the next character beyond the last character in the current window of consideration with the exclusive-or product of the segment, exclusive-oring the first character of the window of consideration with all of the subsets included in the primary exclusive-or term which comprise the first character and exclusive-oring the next character beyond the last character in the current window of consideration with all of the subsets included in the primary exclusive-or term which comprise the next character.

20. The method of claim 16 further comprising, in step (e) of claim 80, before adjusting said window exclusive-or term, recording the first character of the window of consideration into said difference signature in said memory media.

21. The method of claim 16 wherein said step of recording information identifying the respective token in step (2d)(iii) of claim 16 comprises recording an index of the segment in the token table which corresponds to the respective token.

22. The method of claim 16 wherein said step of recording information identifying the respective token in step (2d)(iii) of claim 16 comprises recording the offset of the segment in the first data file which corresponds to the respective token.

23. A method for quickly recording differences between first and second data files having a plurality of fixed length segments in a memory media associated with a programmable data processor, when the majority of insertions in and deletions of characters in segments of the first file are known to change the offsets of only those segments where said insertions and deletion have been made but do not change the offsets of adjacent segments, comprising the steps of:

(1) generating a token table in said memory media by
  (a) reading a fixed length segment of said data file into said memory media;
  (b) generating a primary exclusive-or term for the segment;
  (c) generating a secondary order sensitive term;
  (d) concatenating said primary exclusive-or term and said secondary order sensitive term into a token;
  (e) recording said token in said memory media; and
  (f) repeating steps (a)–(e) for each of said plurality of fixed length segments until all of said segments in said data file have been read and the token table contains one token for each segment in said data file; and (2) recording differences between the first and second computer data files, using the token table, by
  (a) defining a window of consideration for said second data file starting at the first character of said second file, said windows having the same number of characters as each of said plurality of fixed length segments of said first data file;
  (b) generating a window exclusive-or term for the window of consideration in the same manner that the primary exclusive-or term for each segment is generated;
  (c) selecting a token from the token table at an index in the token table which is determined by dividing the offset of the window of consideration by the number of characters in a segment to obtain an index value and comparing said window exclusive-or term with the primary exclusive-or term of the selected token in the token table corresponding to the index for the segment containing said index value;

(d) if a matching primary exclusive-or term is found in the token table,
   (i) generating a window order sensitive term for the characters in the window of consideration in the same manner that the secondary order sensitive term for each segment is generated;
   (ii) comparing said window order sensitive term with the secondary order sensitive term which forms part of the token corresponding to the matching primary exclusive-or term; and
   (iii) when the window exclusive-or term and the window order sensitive term match the primary exclusive-or term and secondary order sensitive term of a respective token in the token table, recording the index of the respective token and the offset of the first character of the window of consideration in a difference signature in said memory media;

(e) advancing the window of consideration by the length of a segment to beyond the last character in the current window of consideration and returning to step (2b); and (f) repeating steps (2c) through (2e) until the window of consideration reaches the end of the second data file.

24. The method of claim 23 wherein the secondary order sensitive term comprises a cyclic redundancy check product term.

25. The method according to claim 85 further comprising, after step (2d) and before step (2e) of claim 24, when the window exclusive-or term or the secondary cyclic redundancy check product term for the window of consideration does not match the corresponding primary exclusive-or term or secondary cyclic redundancy check product term for the respective token in the token table, recording all of the characters within the window of consideration into said difference signature in said memory media.

26. A method according to claim 16 or 23 for using said difference signature and said first data file to construct said second data file comprising the steps of:
   (a) reading a section of said difference signature;
   (b) if said section indicates a match between segments of said first and second data files, determining the corresponding offset in said first data file from the token table, and read the character segment at said offset into said second data file,
   (c) if said section indicates non-matching characters, reading said characters into said second data file from said difference signature; and
   (d) repeat steps (a)-(c) until all sections of the difference signature are read.

27. A method according to claim 16 or 23 to efficiently store multiple versions of a file by storing a copy of said original data file and said difference signature in a memory media.

28. A method according to claim 27 for backing up said second file wherein said programmable data processor for updating said original file is in a first memory device and said copy of said original file and said difference signature is stored in a second memory device.

* * * * *